United States Patent [19]

Ranade et al.

[11] Patent Number: 4,507,434

[45] Date of Patent: Mar. 26, 1985

[54] BLENDS OF VINYL HALIDE-POLYOLEFIN GRAFT POLYMERS AND POLYCARBONATE POLYMERS

[75] Inventors: Gautam R. Ranade, Grand Island; Gideon Salee, Williamsville, both of N.Y.

[73] Assignee: Occidental Chemical Corporation, Niagara Falls, N.Y.

[21] Appl. No.: 541,230

[22] Filed: Oct. 12, 1983

[51] Int. Cl.³ .................... C08L 51/06; C08L 69/00
[52] U.S. Cl. ........................................ 525/67; 525/71
[58] Field of Search ........................................ 525/67

[56] References Cited

U.S. PATENT DOCUMENTS 3,882,192  5/1975  Elghani et al. .................. 525/67
4,105,711  8/1978  Hardt et al. ..................... 525/67

*Primary Examiner*—Carman J. Seccuro
*Attorney, Agent, or Firm*—J. F. Tao; J. F. Mudd

[57] ABSTRACT

A novel thermoplastic polymer composition comprises a high impact vinyl halide polymer, particularly a vinyl halide-polyolefin graft polymer, and a polycarbonate.

9 Claims, No Drawings

BLENDS OF VINYL HALIDE-POLYOLEFIN GRAFT POLYMERS AND POLYCARBONATE POLYMERS

BACKGROUND OF THE INVENTION

The present invention relates to thermoplastic polymer blends which can be molded into plastic articles having improved properties. The polyblends of the present invention contain graft copolymer of a vinyl halide or of a vinyl halide and a comonomer copolymerizable therewith on a polyolefin component. Such copolymers are hereinafter referred to as "vinyl halide-polyolefin graft copolymers". The blends described in the present invention also contain polycarbonate polymers.

Polyvinyl halide, especially polyvinyl chloride polymers are widely used thermoplastic materials having many favorable properties. Such conventional non-graft vinyl halide polymers do not have heat distortion temperatures which are sufficiently high to adapt such polymers to much more wide use. Moreover, such polymers, especially rigid polyvinyl halide polymers, do not have a high impact resistance at ambient or subambient temperatures. Thus, at ambient temperature, i.e., at about 20° C., corresponding to about 68° F., the noted Izod impact resistance of vinyl halide homo- and copolymers is only of the order of about 0.4 to less than about 1 ft-lb/inch. At subambient temperatures, e.g., down to −20° F. or lower, the notched Izod impact resistance of these polymers becomes vanishingly small or negligible.

It has been previously proposed to add minor amounts of an appropriate polymer additive, or additives, to improve ambient impact resistance of conventional polyvinyl polymer compositions. Usually, such additives are useful in ranges from about 3 to about 15 percent by weight of the polyvinyl halide polymer. Among the materials which have been found acceptable as polyvinyl halide impact modifiers are ABS polymers. Such impact modifiers moderately enhance the ambient temperature impact resistance of conventional vinyl halide polymers, i.e., generally raise the ambient temperature notched izod impact resistance of the polymer to about 2 to 10 ft-lbs/inch. However, these impact modifiers are relatively ineffective in imparting a satisfactory subambient temperature impact resistance to the polymer, i.e., the −20° F. notched Izod impact resistance of the polymer containing the impact modifier is well below 1 ft-lb/inch and usually is about 0.4 to 0.5 ft-lb/inch.

Recently, vinyl halide-polyolefin graft copolymers have been developed to be a commercial reality. Such copolymers are produced by polymerization of vinyl halide (or a monomer mixture of vinyl halide and copolymerizable ethylenically unsaturated comonomer) in the presence of a polyolefin elastomer. Such reaction yields a polymer product which contains vinyl halide polymer chains bound, i.e., grafted at various sites along the chain of the trunk olefin as well as ungrafted vinyl halide polymer and ungrafted polyolefin. The graft polymer product, especially the graft polymer product prepared by a liquid phase bulk polymerization reaction, has improved impact resistance at both ambient temperatures and subambient temperatures, compared to the aforementioned conventional, i.e., ungrafted, vinyl halide polymers, even when the latter are blended with a conventional polyvinyl halide impact modifying polymer additive.

The bulk polymerization-prepared graft polymer product is even distinguished from the corresponding graft polymer prepared by a non-bulk polymerization technique, e.g., suspension polymerization, by an enhanced impact resistance at both low and ambient temperature and by breakage by the desirable ductile breakage mode rather than by an undesirable brittle breakage mode.

U.S. Pat. Nos. 4,005,037, 4,105,711 and 4,239,861 describe the blends of polyvinyl chloride homopolymer with polycarbonate polymers. Even though the blends described in these patent applications have increased heat distortion temperatures, they suffer from a significant disadvantage in that the impact strengths of these blends are poor, making them unsuitable for a large number of applications where resistance to impact is desirable in a plastic component. The problem of poor impact strength at these blends worsens at subambient temperatures (−20° F. or lower).

It has now been found that further improved polymer products can be prepared by blending the vinyl halide polyolefin graft polymers, especially those produced by a liquid phase bulk polymerization reaction and polycarbonate polymers described hereinafter.

The molecular miscibility exhibited by the matrix phases of these polymeric components of the invention offers several advantages. The miscibility provides excellent mechanical compatibility. Superior weld line strengths and improved surface properties can be obtained when the polymeric components exhibit molecular miscibility. A problem of possible deterioration of the properties due to phase separation during or after processing may exist for an immiscible blend. This is likely in case of the injection molding process which typically uses very high shear rates. This problem is unlikely in a case where the polymeric components exhibit molecular miscibility.

SUMMARY OF THE INVENTION

The present invention relates to a moldable thermoplastic polymer composition which is comprised of a blend of a high impact vinyl halide polymer and a polycarbonate polymer. The preferred high impact vinyl polymer is a vinyl halide hydrocarbon polyolefin graft polymer. By polyvinyl halide-polyolefin graft polymer is meant the product of the graft polymerization of vinyl halide in the presence of an olefin trunk polymer reactant as further described below.

The polycarbonate polymer component is the well known polymeric product of phosgene and a bisphenol which has high performance engineering properties.

Optionally a third polymeric component may also be employed to further enhance the properties of the blends of the invention. This polymer may be of the ABS (acrylonitrile-butadiene-styrene) polymer or ASA (acrylonitrilestyrene-acrylic rubber) polymer, described in greater detail hereinafter.

The blends prepared according to this invention possess very high impact strength at room temperature and are more flame-resistant than pure polycarbonates. The polyvinyl chloride phase exhibits molecular miscibility with the polycarbonate phase. This results in significantly lower processing temperatures. In addition, the blends in the present invention possess excellent subambient temperature (−20° F. or lower) impact stengths which is a necessary requirement in several outdoor applications of plastic components. These polymeric alloys are also dimensionally stable to heat.

DETAILED DESCRIPTION OF THE INVENTION AND THE PREFERRED EMBODIMENTS THEREOF

The proportion of the polycarbonate polymer can range typically from less than 1 percent to more than about 99 weight percent of polycarbonate polymer with the balance being the graft polymer component (and optional ABS or ASA type polymer). Preferably the polycarbonate proportion in the blends of the present invention should be from about 60 percent to about 90 percent. More preferably the percentage of the polycarbonate polymer should be from about 65 percent to about 80 percent. The foregoing percentages are based on the weight of the blend. The ratio of the optional ABS or ASA polymer content to the total content of vinyl halide-polyolefin graft copolymer and polycarbonate polymer can range from 0:100 to 40:60 and preferably from 0:100 to 25:75, all parts by weight.

THE HIGH IMPACT VINYL HALIDE POLYMER

High impact vinyl halide polymers in high impact PVC are generally produced by blending PVC or other vinyl halide polymer with an impact modifier for a vinyl halide polymer.

Several different types of impact modifiers can be used to prepare high impact polyvinyl chloride formulations. These modifiers can be of the MBS (methacrylate-butadiene-styrene) type, ABS (acrylonitrile-butadiene-styrene) type, MABS (methacrylate-acrylonitrile-butadiene-styrene) type, chlorinated polyethylene type or copolymers of ethylene, such as ethylene vinyl acetate. The impact modifier can also be all acrylic type, such as, Durastrength 200 (M&T Chemical Company). Some of the examples of ABS, MBS or MABS impact modifiers are Blendex series of modifiers by Borg Warner Company (Blendex 301, Blendex 435, Blendex 301, Blendex 101, Blendex 121, etc.). Additional suitable impact modifiers used to prepare high impact PVC formulations can be Acryloid series of impact modifiers by Rohm and Haas Company, such as, Acryloid KM-653, Acryloid KM-641, Acryloid KM-323B, Acryloid KM-611 and Acryloid KM-330, etc.

The proportions of these modifiers in the polyvinyl chloride or other vinyl halide polymer can vary depending on the type and efficiency of the modifier, from 3 parts to 30 parts by weight per hundred parts of the resin. Preferably, the loading of modifier would be in the range from 5 parts to 15 parts by weight per hundred parts of the resin.

The impact modifiers for vinyl polymers are described in
(1) Encyclopedia of PVC, Edited by Leonard J. Nass, Vol. 2, Marcel Dekker, Inc. N.Y. and Basel.
(2) Technical Bulletin on Durastrength-200 Impact Modifier by M&T Chemical Company.
(3) Technical Bulletin on Acryloid KM-330 Modifier, Rohm and Haas Company
(4) Technical Bulletin on Blendex series of modifiers by Borg and Warner Company.

THE POLYVINYL HALIDE-POLYOLEFIN GRAFT COPOLYMER COMPONENT

The polyvinyl halide copolymer component is a graft copolymer of a vinyl halide (or of a vinyl halide and a comonomer copolymerizable therewith) and a polyolefin elastomer. The graft polyvinyl halide component may suitably be obtained by polymerizing a mixture of vinyl halide monomer with one or more ethylenically unsaturated comonomers (or more conveniently a vinyl halide monomer alone) in the presence of an olefin trunk polymer reactant.

The vinyl halide-graft copolymers of the polyolefin elastomers are prepared by polymerizing the vinyl halide in the presence of about 0.05 to about 20 percent, preferably about 1 to about 20 percent, based on the weight of vinyl halide monomer of the above-described polyolefin elastomer. Preparation of such vinyl halide-polyolefin graft copolymer according to emulsion and suspension polymerization techniques is described in G. Natta et al, U.S. Pat. No. 3,812,204, the disclosure of which is incorporated herein by reference. Preparation of such vinyl halide-polyolefin graft copolymer by vapor phase and solution polymerization techniques are described, respectively, in J. Dumoulin et al, U.S. Pat. No. 3,789,083 and F. M. Rugg et al, U.S. Pat. No. 2,947,719, the disclosures of which are incorporated herein by reference. Desirably, the preparation of the vinyl halide polyolefin graft copolymers useful as the polyvinyl halide component of the composition of the invention is effected by a bulk liquid phase polymerization technique as described by A. Takahashi, U.S. Pat. Nos. 4,071,582, 4,163,033 and 4,169,870, and by L. E. Walker, U.S. Pat. Nos. 4,007,235, 4,067,928 and 4,195,137, the disclosure of which Takahashi and Walker patents is incorporated herein by reference.

Monomer Component

Suitable ethylenically unsaturated comonomer materials which can be used include: mono-olefinically unsaturated esters including vinyl esters, such as vinyl acetate, vinyl stearate, vinyl benzoate, and vinyl-p-chlorobenzoates; alkyl methacrylates, such as methyl, ethyl, propyl and stearyl methacrylates; alkyl crotonates, such as octyl crotonate; alkyl acrylates, such as methyl, ethyl, hexyl and stearyl acrylates; hydroxyether and tertiary butylamino acrylates, such as 2-ethoxy ethyl acrylate; isopropenyl esters, such as isopropenyl acetate; and other comonomers disclosed in the aforesaid patents of Takahashi.

Polyolefin Component

The polyolefin component can be a homopolymer, bipolymer, terpolymer, tetrapolymer or higher copolymer of olefinic monomers. The olefin polymers can also contain the residue of a polyene, e.g., a non-conjugated diene as a monomer unit. Preferably, the polyolefin is an elastomer.

Olefin homopolymers may be obtained by the polymerization of a suitable monomer, such as ethene, propene, i.e., propylene, butene-1, isobutane, octene or 5-methylhexene-1.

Suitable comonomers for use in preparing the polyolefins are those utilized to prepare the olefin homopolymers as listed above, e.g. propene or butene-1 with ethene and the like. Suitable termonomers are those utilized to prepare homopolymers and copolymers as disclosed above, such as propene, ethene and the like, as well as a polyene. Especially suitable polyene-derived ter- and higher copolymers can be prepared from olefin monomer mixtures containing up to 15 percent, preferably up to about 6 percent by weight, of the polyene (preferably non-conjugated), such as dicyclopentadiene, cyclo-octadiene and othe dienes with linear or cyclic chains. The polyolefin used may also be a halogenated polyolefin, such as a chlorinated brominated or fluorinated polyolefin.

Preferably, however, the polyolefin is a hydrocarbon polyolefin, that is, a polyolefin containing only carbon and hydrogen atoms.

The polyolefins used are characterized by being soluble, partially soluble or dispersible at ambient temperatures and pressure in the vinyl chloride graft copolymer component, and in having, typically, monomeric units of 2 to 8 carbon atoms. The weight average molecular weight of the olefin polymers, copolymers, terpolymers and tetrapolymers can vary from about 50,000 to about 1,000,000 and higher. Preferred as polyolefin elastomers for use in preparing vinyl halide graft polymers for use in the invention are ethene polyolefin elastomers and ethene-propene-diene polyolefin elastomers.

More particularly the hydrocarbon olefin polymers which are suitably employed as trunk polymer reactant in the preparation of the present graft polymers is an elastomer having a weight average molecular weight of about 50,000 to 1,000,000, preferably of about 50,000 to 300,000 which is soluble, partially soluble or dispersible in the liquid phase polymerization reaction mixture. The trunk polyolefin reactant is suitably selected from the group consisting of:

(a) a homopolymer of an aliphatic hydrocargon olefin monomer of 2 to 8 carbon atoms;
(b) a copolymer of 2 or more of said olefin monomers; and
(c) a polymer of at least one of said olefin monomers and no more than 15 percent, based on the weight of the polymer, of a non-conjugated aliphatic hydrocarbon polyene of 4 to 18 carbon atoms wherein all of the carbon-to-carbon double bonds do not form a conjugated system.

POLYCARBONATE COMPONENT

The polycarbonate polymers used in the present invention may be prepared by diphasic interfacial process from phosgene and bisphenols or by different methods described in the literature (see H. Schenell, Chemistry and Physics of Polycarbonates, Interscience Publishers, New York-London-Sydney, 1964). Suitable polycarbonates to be used in the present invention are homo- and co-polycarbonates and mixtures, different homo- and co-polycarbonates, ranging in weight average, molecular weight from 10,000 to 200,000. Preferably, the weight average molecular weight should be in the range from 20,000 to 80,000. U.S. Pat. Nos. 4,239,861, 4,105,711 and 4,005,037 describe in detail the composition and the preparation of various polycarbonate polymers. The disclosures of these patents are incorporated herein by reference.

AUXILIARY POLYMER COMPONENT

The polymer blends of this invention can be further modified by the incorporation of a styrene-acrylonitrile copolymer that is modified with polybutadiene as in ABS polymers, and with other substrate polymers referred to as ASA polymers in copending application Ser. No. (Case 4746), filed on even date herewith. The ASA polymers are polymers of styrene and acrylonitrile that are modified by blending with or reacting with acrylic polymers, chlorinated polyethylene or ethylene, propylene polyene modified polymers. The ASA polymers can be prepared as described in U.S. Pat. Nos. 3,489,821; 3,953,540; 4,111,876 and 4,151,226, the disclosures of which are incorporated herein by reference.

OTHER OPTIONAL ADDITIVES

The composition of the invention can also contain various functional additives which additives are conventional in the preparation of vinyl halide polymer molding compositions. Typically, these additives include thermal and/or light stabilizers as well as external and internal lubricants and processing aids for the graft vinyl halide resin component and other polymers of the blends of the invention.

Stabilizers suitable for use in making the vinyl halide graft polymer compositions of the invention include materials known to stabilize polyvinyl halide against the degration action of heat and/or light. They include known stabilizers, both organic and inorganic, such as metal salt of 6 to 18 carbon atoms, organo-tin compounds, epoxides, amine compounds and organic phosphites. Conveniently, an organo-tin compound, such as a methyl tin mercaptide, is employed as a stabilizer.

A more detailed description of suitable stabilizers, lubricants and processing aids for incorporation into the compositions of the invention is presented in U.S. Pat. No. 4,319,002, the disclosure of which is incorporated herein by reference.

Additional classes of additives known for use in polyvinyl halide resins which can be added optionally to the compositions of the invention in addition to the aforementioned stabilizers, lubricants and processing aids include pigments, dyes and fillers as described in L. R. Brecker, Plastics Engineering, March 1976, "Additives 76", pages 304, the disclosure of which is incorporated herein by reference.

In general, the amount of each type of the aforementioned optional additive employed in the present composition is about 0.01 to about 5 weight percent, preferably about 0.1 to about 3 weight percent, based on the total resin composition.

The compositions of the invention are essentially of the rigid vinyl halide resin type which contain no more than about 10 weight percent of a plasticizer for vinyl halide grade polymer and preferably are free of said plasticizing additive. Typical suitable plasticizer additives (which are generally organic compounds) conventionally employed in polyvinyl halide compositions include, for example, the esters of aliphatic alcohols of medium chain length of about 7 to 11 carbon atoms, with phenyl dicarboxylic acids, such as di-n-octylphthalate and di-iso-nonyl phthalate as well as organic phosphate ester, such as cresyl-diphenylphosphate and octyl-diphenyl-phosphate. The chemical structure and technology of plasticizers conventionally employed in polyvinyl halide compositions is more particularly discussed in L. R. Brecker, op.cit. Page 5, the disclosure of which is incorporated herein by reference.

PREPARATION OF BLENDS

The compositions of the invention can be prepared by conventional milling and molding techniques. Generally, the component polymers (and, if desired, the above-described optional additives) are added as a particulate solid mixture to a roll mill or a Banbury-type mixer and milled at an elevated temperature conventional for processing rigid vinyl halide polymer compositions. Alternatively, the two polymers may be melted separately, for example, in extruders, and the two melts may then be combined, or the polycarbonate or polyvinyl chloride may first be melted separately, e.g., on rollers, and the second component may then be added. The blends described in the present invention may also be prepard from solutions by dissolving their components in a solvent or solvent mixture and then isolating them together by the addition of a non-solvent or by pouring the solution dropwise into a precipitating agent or by evaporating the solvent. The resultant polymer blend obtained as a product from the milling and mixing operation is molded by either an injection or compression molding technique or extruded to produce articles of particular desired shapes as elevated temperature and pressure conditions which are conventional in molding rigid polyvinyl halide compositions. Desirably, an injection molding technique is employed to prepare the aforementioned articles which can be in various shapes including bars, plates, rings, rods, as well as sheets and films. Physical or chemical blowing agents may also be added to the polymer alloys according to the invention for the purpose of obtaining a foam structure under suitable operating conditions.

THE EXAMPLES

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

In the following examples, blends were prepared of the following polymer components:

Vinyl Polymer—A

A graft polymer of vinyl chloride and an EPOM elastomer prepared in a two-stage mass polymerization process such as described in U.S. Pat. No. 4,071,582. The EPDM elastomer was a copolymer of ethylene, propylene and ethylidene norbornene and was present in the graft polymer in a proportion of about 14 weight percent. The ethylene to propylene ratio was approximately 60 to 40. The graft polymer had a number average molecular weight of 24,000, a weight average molecular weight of 89,900 and a ratio of weight to number average molecular weight of 3.74. The graft polymer was compounded in a Henschel mixer using two parts of Thermolite T-31 stabilizer, two parts of Acryloid K-120N (Rohm & Haas) processing aid, 1.5 parts of Also MS (Glycol Chemicals) lubricant, and 0.25 parts of calcium stearate, lubricant; all parts by weight per 100 parts by weight of the graft polymer.

Vinyl Polymer—B

A graft polymer of vinyl chloride and an EPDM elastomer as in Vinyl Polymer A except that the proportion of EPDM elastomer was about 7 percent. The graft polymer was compounded in the same manner and using the same formulation as in the case of Vinyl Polymer A.

ABS Polymer

A polymer of styrene and acrylonitrile and polybutadiene rubber sold commercially as Blendex-702 by Borg Warner Company was used.

ASA Polymer I

A polymer of styrene and acrylonitrile and acrylic rubber sold commercially as ASA-1000 by Stauffer Chemical Company was used. This polymer has a number average molecular weight of about 45,000, a weight average molecular weight of about 130,000, and a ratio of weight to number average molecular weight of 2.87. This polymer contains about 56 percent styrene, 15 percent acrylonitrile and about 29 percent acrylic rubber, all percentages by weight.

ASA Polymer II

A polymer of styrene and acrylonitrile and EPDM (ethylene-propylenediene monomer) elastomer sold commercially as Rovel-701 by Uniroyal Company was used. The polymer has a weight average molecular weight of about 220,000. This polymer contains about 51 percent styrene, 26 percent acrylonitrile and about 23 percent EPDM elastomer.

Polycarbonate Polymer—I, II and III

The polycabonate polymers commercially sold by General Electric Company under the names Lexan-105, Lexan-103, Lexan-101, were used, and are referred to herein as Polycarbonate Polymers I, II and III, respectively. Lexan-101 grade is a high viscosity material for molding thicker sections without sinks. Lexan-103 is a high viscosity, UV-stabilized grade.

All polymers used in these examples were dryed before preparing the blends. The blends were prepared on a two-roll Farrell mill heated using a hot oil system. The roll temperatures used for milling were in the range of 350°–380° F. The milling time was kept to a minimum necessary for obtaining good mixing, normally about 4 to 5 minutes.

All polymers used in these examples were dryed before preparing the blends. The blends were prepared on a two-roll Farrell mill heated using a hot oil system. The roll temperatures used for milling were in the range of 350°–380° F. The milling time was kept to a minimun necessary for obtaining good mixing, normally about 4 to 5 minutes.

Due care was taken to obtain a good lateral mixing on the mill. The blend was removed from the mill in the form of a sheet and quickly cut into small pieces. These pieces were coarse ground after cooling. The injection molded tensile and flexural bars were used for evaluating mechanical properties. The injection molding of samples having appropriate ASTM configurations was carried out using an Arburg injection molding machine (Model 221E-150). Table I shows the details of the testing procedure used to obtain various properties.

TABLE 1

| | | Summary of Testing and Characterization Methods | | | |
|---|---|---|---|---|---|
| Property/Data | ASTM Method | Instrument Used | Number of Samples | Type of Sample | Comments |
| Tensile Properties Modulus Strength (Yield) Elongation (Yield) | D638 | Instron-Model TTC | 5 | Injection Molded Std dog bone shape Tensile bar. (⅛" × ½"6½") | Strain rate of 0.2"/minute |
| Izod Impact | D256 | Izod Impact | 3 | Injection Molded | Three bars tested at both sprue and |

TABLE 1-continued

Summary of Testing and Characterization Methods

| Property/Data | ASTM Method | Instrument Used | Number of Samples | Type of Sample | Comments |
|---|---|---|---|---|---|
| Room Temperature (23.3° C.) or Low Temperature (−28° C.) | | Tester | | Flex Bars (¼" × ⅛" × 5") | vent ends. All samples were notched using standard size. |
| Specific Gravity | D792 | Standard Balance | 2 | Injection Molded Bar | Calculated from weight loss of the sample after immersing in distilled water. |
| Heat Distortion Temperature | D648 | Standard Heat Deflection Bath | 2 | Injection Molded Flex Bar (¼" × ⅛" /5") | Tested at 264 psi. Sample immersed in silicone. Bath heated at 2° C./min. Sample bar tested edgewise. Two different conditioning methods used for each composition: (a) 48 hours at 50° C. (b) 24 hours at 70° C. |
| Flexural Properties Modulus Strength (Yield) Strain (Yield) | D790 | Instron Model-TMS | 5 | Injection Molded Flexural Bar (¼" × ⅛" × 5") | Cross head speed of 0.5" per minute |

EXAMPLE 1

Vinyl Polymer A and Polycarbonate Polymer III were blended in a weight ratio of 30:70 respectively, in accordance with the foregoing procedures. Physical properties were run according to the foregoing procedure and the results are shown in Table 2.

TABLE 2

| Mechanical Properties | |
|---|---|
| Tensile Strength psi × 10 × $10^{-3}$ | 7.98 |
| Tensile Modulus psi × 10 × $10^{-5}$ | 3.42 |
| Elongation percent | 5.25 |
| Notched Izod Impact at 23.3° C., ft-lb/in | 13.6 |
| Notched Izod Impact at −28.8° C., ft-lb/in | 2.33 |
| Flexural Strength psi × $10^{-3}$ | 13.74 |
| Percent Strain | 6.39 |
| Rockwell Hardness | R-113 |
| Shore Durometer Hardness | D-82 |
| Specific Gravity | 1.22 |
| Mold Shrinkage, inch/inch | 0.006 |
| Water Absorption (24 hours), % | 0.32 |
| Thermal Properties | |
| Heat Distortion Temperature (264 psi), °C. | 10 |
| Heat Distortion Temperature (annealed), °C. | 106 |
| UL-94 Rating ⅛" Thickness | V-O |
| 1/16" Thickness | V-O |
| Brabender Torque Rheometer Data | |
| Fusion Time, Seconds | 46.8 |
| Maximum Fusion Torque, meter-grams | 6040 |
| Equilibrium Torque, meter-grams | 1150 |
| Decomposition Time, meter-grams | 9.4 |

EXAMPLE 2

The blends of Vinyl Polymer A and Polycarbonate Polymer III were prepared and tested for heat distortion temperature and impact strength and flame retardance. The results are tabulated in Table 3 and Table 4.

TABLE 3

| Composition Vinyl Polymer A: Polycarbonate Polymer III | Notched Izod Impact Strength at | | Heat Distortion Temperature @ 264 psi (annealed 48 hrs @ 50° C.) °C. |
|---|---|---|---|
| | 23.3° C. | −28.8° C. | |
| | ft-lb/inch | | |
| 100:0 | 20 | 1.4 | 66 |
| 80:20 | 6.1 | 1.1 | 70 |
| 60:40 | 3.0 | 1.6 | 74 |
| 40:60 | 5.1 | 2.0 | 91 |
| 20:80 | 15.1 | 3.4 | 105 |
| 0:100 | 14 | — | — |

TABLE 4

| Composition Vinyl Polymer A: Polycarbonate Polymer III | UL-94 Rating | | Notched Izod Impact Strength at | | Heat Distortion Temperature @ 264 psi (annealed 48 hrs @ 50° C.) °C. |
|---|---|---|---|---|---|
| | ⅛" | 1/16" | 23.3° C. | −28.8° C. | |
| | | | ft-lb/inch | | |
| 40:60 | V-O | V-O | 8.7 | 1.7 | 89 (97) |
| 35:65 | V-O | V-O | 5.7 | 1.7 | 95 (107) |
| 35:65 | V-O | V-O | 12.6 | 2.5 | 92 (102) |
| 35:65 | V-O | V-O | 11.8 | 1.8 | 96 (102) |
| 30:70 | V-O | V-O | 13.6 | 2.4 | 99 (104) |
| 25:75 | V-O | V-O | 13.9 | 2.5 | 102 (106) |

EXAMPLE 2

The blends of Vinyl Polymer A and Polycarbonate Polymer II (or III) ABS (or ASA) Polymer were prepared in various proportions and tested for heat distortion temperatures and notched izod impact strengths. The results of these tests are tabulated in Table 5, 6 and 7.

TABLE 5

| Composition Vinyl Polymer B: Polycarbonate Polymer II/ ABS Polymer | Notched Izod Impact Strength at | | Heat Distortion Temperature @ 264 psi (annealed 48 hrs @ 50° C.) °C. |
|---|---|---|---|
| | 23.3° C. | −28.8° C. | |
| | ft-lb/inch | | |
| 40:55:5 | 2.3 | 0.9 | 90 |
| 40:50:10 | 2.0 | 0.9 | 86.5 |
| 40:45:15 | 1.8 | 0.7 | 82.3 |
| 40:40:20 | 1.5 | 0.8 | 81 |

TABLE 6

| Composition Vinyl Polymer B: Polycarbonate Polymer III/ ASA Polymer I | Notched Izod Impact Strength at | | Heat Distortion Temperature @ 264 psi (annealed 48 hrs @ 50° C.) |
|---|---|---|---|
| | 23.3° C. | −28.8° C. | |
| 40:55:5 | 2.7 | 1.1 | 85.8 |
| 40:50:10 | 2.5 | 1.1 | 82 |
| 40:45:15 | 3.0 | 1.0 | 81.8 |
| 40:40:20 | 2.9 | 0.7 | 78.5 |
| 100:0:0 | 16.7 | 0.9 | 65.5 |

TABLE 7

| Composition Vinyl Polymer B: Polycarbonate Polymer II/ ASA Polymer II | Notched Izod Impact Strength at ft-lb/inch | | Heat Distortion Temperature @ 264 psi (annealed 48 hrs @ 50° C.) °C. |
|---|---|---|---|
| | 23.3° C. | −28.8° C. | |
| 40:55:5 | 3.1 | 0.8 | 87.3 |
| 40:50:10 | 2.0 | 0.8 | 84.3 |
| 40:45:15 | 2.4 | 0.9 | 80.8 |
| 40:40:20 | 2.1 | 1.0 | 79.5 |

EXAMPLE 4

Vinyl Polymer B was blended with either Polycarbonate Polymer I or Polycarbonate Polymer II in the proportions shown in Tables 8 and 9. A 55-gram sample of each blend was dried and tested by Brabender Torque Rheometer. The results of these tests are given below.

TABLE 8

BRABENDER TORQUE RHEOMETER DATA

| Composition Vinyl Polymer B:Polycarbonate Polymer I | 60:40 | 40:60 | 20:80 |
|---|---|---|---|
| Ram Pressure (grams) | 7500 | 7500 | 7500 |
| R.P.M. | 63 | 63 | 63 |
| Max Fusion Peak (Seconds) | 18.5 | 33.6 | 43.0 |
| Max Fusion Torque (meter-gram) | 7500 | 7000 | 7820 |
| Equilibrium Torque (meter-gram) | 1125 | 1550 | 1950 |
| Decomposition Time (minutes) | 18.9 | 12.2 | 7.8 |
| Stock Held at (°F.) | 400 | 400 | 400 |

TABLE 9

BRABENDER TORQUE RHEOMETER DATA

| Composition Vinyl Polymer B: Polycarbonate Polymer II | 40:60 | 45:55 | 50:50 | 55:45 |
|---|---|---|---|---|
| Ram Pressure (grams) | 7500 | 7500 | 7500 | 7500 |
| R.P.M. | 63 | 63 | 63 | 63 |
| Max Fusion Peak (seconds) | 31.2 | 23.4 | 21.8 | 25.2 |
| Max Fusion Torque (meter-gram) | 7575 | 6300 | 6700 | 6600 |
| Equilibrium Torque (meter-gram) | 1500 | 1450 | 1375 | 1200 |
| Decomposition Time (minutes) | 10.5 | 14.0 | 13.6 | 17.1 |
| Stock held at (°F.) | 400 | 400 | 400 | 400 |

EXAMPLE 5

Blends of Vinyl Polymer B with Polycarbonate Polymer III were prepared using previously described procedure in the proportions 60:40 and 40:60 by weight. These blends were molded into bars and thermally aged at 70° C. up to one month. Tables 10 and 11 show the variation of the heat distortion temperatures and impact strengths of these blends due to thermal aging.

TABLE 10

COMPOSITION: 60:40 Vinyl Polymer B: Polycarbonate Polymer III

| | Originals | Thermal Aging at 70° C. | | |
|---|---|---|---|---|
| | | 1 Day | 1 Week | 1 Month |
| Heat Distortion Temperature (264 psi) | 74.3° C. | 81° C. | 85° C. | 87° C. |
| 23.3° C. Notched Izod Impact ft-lb/inch | 2.6 | 2.1 | 1.7 | 0.9 |
| −28.8° C. Notched Izod Impact ft-lb/inch | 0.8 | 0.8 | 0.7 | 0.3 |

TABLE 11

COMPOSITION: 40:60 Vinyl Polymer B: Polycarbonate Polymer III

| | Originals | Thermal Aging at 70° C. | | |
|---|---|---|---|---|
| | | 1 Day | 1 Week | 1 Month |
| Heat Distortion Temperature (264 psi) | 91° C. | 96.3° C. | 104° C. | 105° C. |
| 23.3° C. Notched Izod Impact ft-lb/inch | 5.5 | 3.1 | 2.8 | 1.3 |
| −28.8° C. Notched Izod Impact ft-lb/inch | 2.0 | 1.1 | 1.1 | 0.6 |

The blends prepared according to this invention possess very high impact strength at room temperature and are more flame-resistant than pure polycarbonates. The polyvinyl chloride phase exhibits molecular miscibility with the polycarbonate phase. This results in significantly lower processing temperatures. In addition, the blends in the present invention possess excellent sub-ambient temperature (−20° F. or lower) impact stengths which is a necessary requirement in several outdoor applications of plastic components. These polymeric alloys are also dimensionally stable to heat.

We claim:

1. A polymer composition consisting essentially of a vinyl halide hydrocarbon polyolefin graft polymer and a polycarbonate.

2. The polymer composition of claim 1 wherein the vinyl halide-hydrocarbon polyolefin graft polymer comprises the product of bulk liquid phase polymerization of vinyl halide monomer alone or in combination with up to 50% by weight based on the total weight of monomer of another ethylenically unsaturated monomer copolymerizable therewith, in the presence of a free radical initiator compound for said polymerization, and about 0.05% to about 20% by weight, based upon said vinyl halide monomer, of a hydrocarbon olefin trunk polymer.

3. The polymer composition of claim 2 wherein the vinyl halide is vinyl chloride.

4. A polymer composition consisting essentially of a vinyl chloride polyolefin graft polymer wherein the polyolefin is present in a proportion of about 2 to about 20 weight percent based on the weight of vinyl chloride, and a polycarbonate.

5. The polymer composition of claim 4 where the polyolefin is present in a proportion of about 5 to about 18 weight percent based on the weight of vinyl chloride.

6. The polymer composition of claim 5 wherein the polyolefin is a terpolymer of ethylene propylene and a diene monomer.

7. The polymer composition of claim 6 wherein the vinyl chloride polyolefin graft polymer is present in a proportion of about 40 to about 60 weight percent based on the weight of polymer components.

8. The polymer composition of claim 4 which also contains an ABS polymer.

9. The polymer composition of claim 4 which also contains a styrene acrylonitile copolymer that is modified with an acrylic polymer, chlorinated polyethylene or an ethylene, propylene polyene modified polymer.

* * * * *